United States Patent
Erman

(10) Patent No.: US 8,201,106 B2
(45) Date of Patent: Jun. 12, 2012

(54) METHOD FOR TRANSFORMING A TREE STRUCTURE INTO A MORE HUMAN-COMPREHENSIBLE DOCUMENT

(75) Inventor: Bilgehan Erman, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1135 days.

(21) Appl. No.: 11/174,114

(22) Filed: Jul. 1, 2005

(65) Prior Publication Data

US 2007/0006071 A1 Jan. 4, 2007

(51) Int. Cl.
*G06F 3/00* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. ......... 715/853; 715/227; 715/234; 715/760
(58) Field of Classification Search .................. 715/513, 715/760, 227, 234, 853
See application file for complete search history.

(56) References Cited

U.S. PATENT DOCUMENTS

| | | | |
|---|---|---|---|
| 6,112,209 A * | 8/2000 | Gusack | 1/1 |
| 6,662,237 B1 * | 12/2003 | Leckie | 719/320 |
| 6,708,164 B1 * | 3/2004 | Cseri et al. | 707/4 |
| 6,944,818 B2 * | 9/2005 | Newman et al. | 715/517 |
| 7,136,060 B2 * | 11/2006 | Bauer et al. | 345/419 |
| 2001/0018696 A1 * | 8/2001 | Hori et al. | 707/513 |
| 2002/0191033 A1 * | 12/2002 | Roberts | 345/853 |
| 2003/0037181 A1 * | 2/2003 | Freed | 709/328 |
| 2003/0093756 A1 * | 5/2003 | Behzadi et al. | 715/501.1 |
| 2004/0205535 A1 * | 10/2004 | Newman et al. | 715/509 |

OTHER PUBLICATIONS

"How to . . . Use Windows Explorer," [online] Feb. 2001 [accessed Nov. 21, 2006], Smart Computing, vol. 7 Issue 2, pp. 67-68. Retrieved from Internet <URL: http://www.smartcomputing.com/editorial/article.asp?article=articles/archive/l0702/28I02/28I02.asp>.*

Shiran, Yehuda and Shiran, Tomer. "Web Services, Part V: XML and XSLT Programming" [online] Dec. 31, 2001 [accessed Nov. 21, 2006], WebReference.com. Retrieved from Internet <URL: http://www.webreference.com/js/column100/index.html>, pp. 5-6.*

* cited by examiner

*Primary Examiner* — Chat Do
*Assistant Examiner* — Stephen Alvesteffer
(74) *Attorney, Agent, or Firm* — Wall & Tong, LLP

(57) ABSTRACT

A recursive method based on three rules by which tree structures representing data, e.g., XML, is transformed into a table-based format so as to be more easily read and understood by a human being without requiring customization based on the particular application and/or the nature of the data contained within the XML representation.

13 Claims, 2 Drawing Sheets

METHOD FOR TRANSFORMING A TREE STRUCTURE INTO A MORE HUMAN-COMPREHENSIBLE DOCUMENT

TECHNICAL FIELD

This invention relates to the transformation of data represented in tree-like data structures, e.g. in extensible markup language (XML), into a document arranged in a format that is more readily understood by human beings.

BACKGROUND OF THE INVENTION

Extensible markup language (XML) has become an industry standard for data exchange between computer systems. XML has also proven to be particularly advantageous for representing a large communications network by describing the elements thereof as well as the relationships between those elements.

Information encoded in XML format always has a tree structure. In particular, for trees represented in XML format, each node of the tree has a) at least a name and it may also have b) at most one value and c) one or more children. Nodes of trees structures without children are known in the art as leaf nodes.

Although XML is text based, due to its formal notation, it is difficult for a human being reading it to comprehend the information represented using XML. This is especially problematic for large XML documents, such as those used to describe a communications network. It has been generally recognized in the art that it would be advantageous for human beings to be readily able to understand the information contained within tree structures such as those represented by XML. To this end, various tools have been developed to convert XML to more human comprehensible formats. However, generally, these tools require customization based on the particular application and/or the nature of the data contained within the XML representation, or they may require a special application to view the human comprehensible format.

SUMMARY OF THE INVENTION

To this end, I have developed a recursive method based on three basic rules by which tree structures representing data, e.g., XML, can be transformed into a table-based format so as to be more easily read and understood by a human being without requiring customization based on the particular application and/or the nature of the data contained within the XML representation. The transformed data in the table-based format may be displayed or printed using conventionally available general purpose applications such as a web browser.

Parsing the XML starts at the root node of the tree as the current node. A table is created for the current node and a row is added as the current row if the current node has children. For each child of the current node, the rules are: 1) For each uniquely named child leaf of the current node a) add a column to the table for the current node that has as its name the name of each uniquely named child leaf node; and b) put the value of the uniquely named child leaf node, if it has one, in the current row under that column. 2) When there is at least one set consisting of multiple child leaf nodes of the current node that have the same name, for each such set create a new table with multiple rows, one row for each of the child leaf nodes of that set that has a value, store the value of the node in its row, and place a pointer to the newly created table in the table for the current node in a column that is named with the name that is common to the multiple child leaf nodes of the set. 3) If a child of the current node has at least one of its own child nodes, i.e., the current node has at least one grandchild, then create a new table for the child that is named with a unique identifier when there is no such table already existing for any children having the same name at that level of the tree. If a new table is created, then place a pointer to the newly created table in the table for the current node in a column that is named with the name of the child. For the same child, create a row in the table with that child's name, i.e., the newly created or already existing table with the child's name. For each such child node, repeat the process recursively, i.e., starting a new instantiation of the algorithm using a) the child node as the current node, b) the table with that child's name as the current table, and c) the new row as the current row.

The resulting tables are displayed in a manner perceivable by a human being, e.g., on a display screen or in a printed hard copy.

If the root node has no children, the process terminates and generates no output.

Advantageously, the report-like structure of the tables that are produced is quite comprehensible by humans. Further advantageously, no knowledge of XML or the tree structure is required for a human to understand the data presented in the tables. Also, advantageously, because related data is presented in a spatially compacted manner as compared to an XML representation, a human being more easily understands relationships between elements of the data, especially for large documents.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Similarly, software modules, or simply modules which are implied to be software, may be represented herein as any combination of flowchart elements or other elements indicating performance of process steps and/or textual description. Such modules may be executed by hardware that is expressly or implicitly shown.

The invention as defined by the claims hereof may reside in the fact that the functionalities provided by the various recited elements are combined and brought together in the manner which the claims call for. Applicant thus regards any techniques which can provide those functionalities as equivalent as those shown herein.

In the description, identically numbered components within different ones of the FIGs. refer to the same components.

Figure 1:
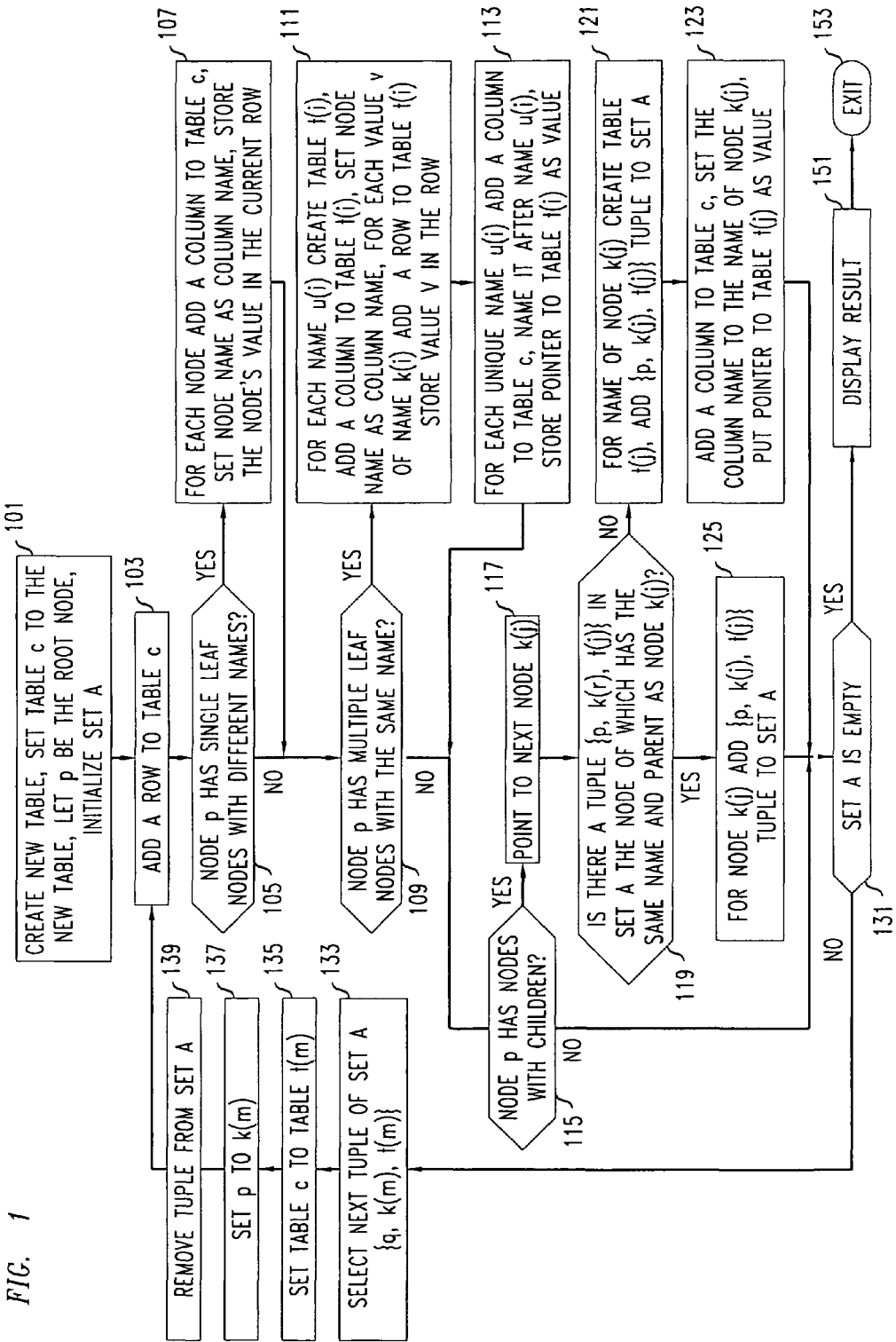
FIG. 1 shows a method by which tree structures representing data, e.g., XML, can be transformed into a table-based format, in accordance with the principles of the invention.
Figure 2:
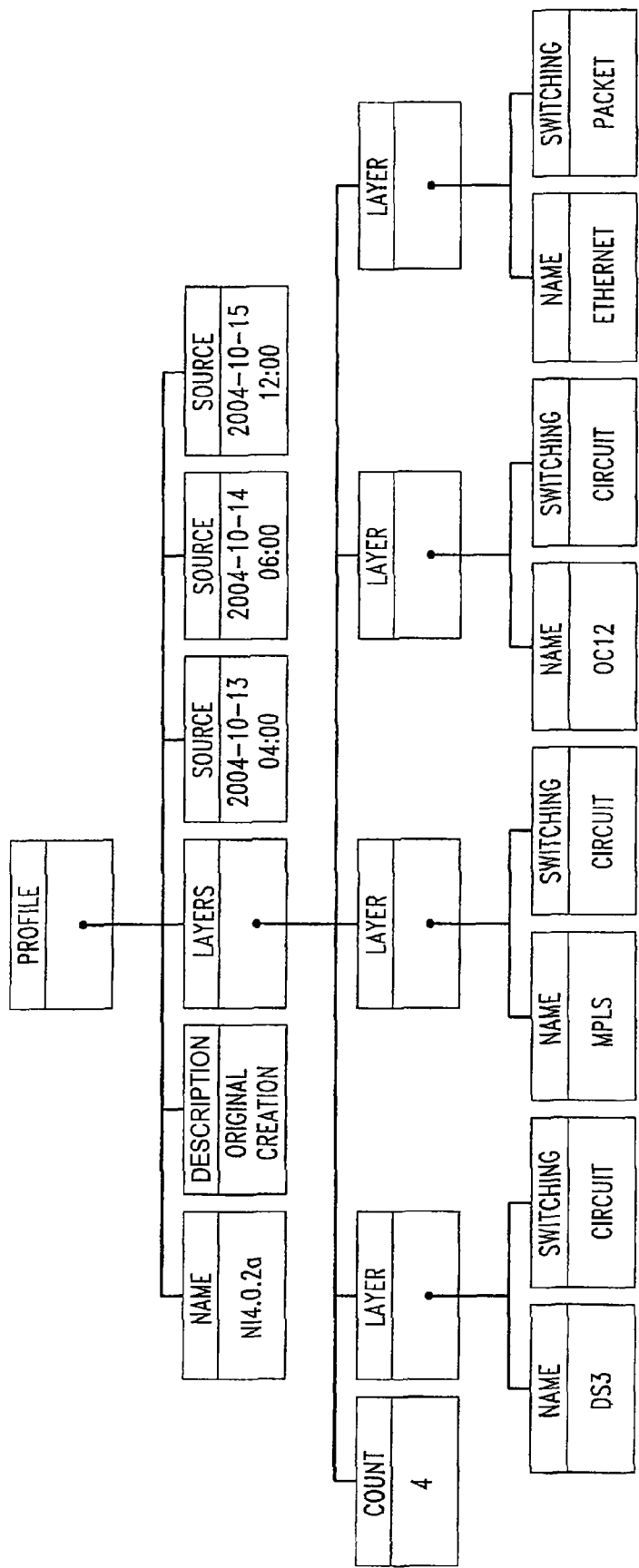
FIG. 2 shows an exemplary tree is shown representation of the XML shown in Table 1.

FIG. 1 shows a recursive method based on three rules by which tree structures representing data, e.g., XML, can be transformed into a table-based format so as to be more easily read and understood by a human being without requiring customization based on the particular application and/or the nature of the data contained within the XML representation, in accordance with the principles of the invention. The process is entered in step 101 when there is a tree, e.g., represented using XML, that is to be converted to a format more easily read and understood by a human being than XML is. In particular, each node of the tree has a) at least a name and it may also have b) at most one value and c) one or more children. An exemplary such tree is shown in FIG. 2, and the XML representation of the tree is shown in Table 1. Table 2 shows the same XML representation of the tree as is shown in Table 1 but as it would appear to a user when formatted by a web browser, e.g., Internet Explorer available from Microsoft Corporation.

TABLE 1

<?xml version="1.0" encoding="UTF-8"?>
<profile description="original creation" name="NI4.0.23a">
<source>2004-10-13-04:00</source><source>2004-10-14-06:00</source>
<source> 2004-10-15-12:00</source><layers count="4">
<layer name="DS3" switching="circuit"/>
<layer name="MPLS" switching="circuit" /><layer name="OC12" switching="circuit"/>
<layer name="Ethernet" switching="packet" /></layers></profile>

TABLE 2

<?xml version="1.0" encoding="UTF-8" ?>
- <profile description="original creation" name="NI4.0.23a">
  <source>2004-10-13-04:00</source>
  <source>2004-10-14-06:00</source>
  <source>2004-10-15-12:00</source>
  - <layers count="4">
    <layer name="DS3" switching="circuit" />
    <layer name="MPLS" switching="circuit" />
    <layer name="OC12" switching="circuit" />
    <layer name="Ethernet" switching="packet" />
  </layers>
</profile>

In step 101 a new table is created, and a variable c points to the new table. Also, a variable p, which is a pointer to nodes, points to the root node of the tree. Furthermore, set A, which will be explained further hereinbelow, is initialized to a null set. Next, in step 103, a row is added to the table being pointed to by c. This is done because whenever a new level begins to be processed, at least one table will be created having at least one row.

Thereafter, conditional branch point 105 tests to determine if the node pointed to by p has any leaf nodes that are unique in their name at that level of the tree. If the test result in step 105 is YES, indicating that there is at least one leaf node with a name that is not the same as any other leaf nodes at the current level of the tree, control passes to step 107. In step 107 a column is added to table c for each leaf node that has a unique name at the current level of the tree, and each column is named with the name of the leaf that caused the column to be created. Control then passes to step 109.

Note that the column names may be added to the table as a title row, or they may just be associated with the columns, at the discretion of the implementer. In any event, ultimately, the names of the columns are preferably displayed or printed in association with the information of the columns that they name.

If the test result in step 105 is NO, that there were no leaf nodes with a name that is not the same as any other leaf nodes at the current level of the tree, or after completion of step 109, control passes to conditional branch point 109. Conditional branch point 109 tests to determine if the node pointed to by p has multiple children that are leaf nodes that each have the same name. If the test result in step 109 is YES, indicating that at least two of the children of the node pointed to by p are leaf nodes that have the same name, control passes to step 111. Note that it is possible that the node pointed to by p may have several sets of child leaf nodes, where each of the child leaf nodes in a set has the same name, but the names of the child leaf nodes in the different sets are different.

In step 111, for each set u(i) of child leaf nodes with the same name, i.e., for each name set u(i), the various name sets being pointed to by index i, a table t(i) is created with one column and the name of the column is set to the name of those child leaf nodes that are in set u(i). For each value of a leaf node in name set u(i) a row is added to table t(i), and the value is stored in the row. Thus, the number of rows in the column is equal to the number of child leaf nodes in name set u(i) that have values. Control then passes to step 113.

In step 113, for each name set u(i) a column is added to the table pointed to by c, the column being named with the name of those child leaf nodes that are in set u(i). A pointer to table t(i) created in step 111 for those child leaf nodes with that name is stored as the value in the current row of the table pointed to by c in the column just created in the table pointed to by c.

If the test result in step 109 is NO, indicating that none of the children of the node pointed to by p are leaf nodes that have the same name, or after completion of step 113, control passes to conditional branch point 115. Conditional branch point 115 tests to determine if the node pointed to by p has any child nodes that themselves have children. If the test result in step 115 is YES, indicating that there is at least one child of the node pointed to by p that has at least one child of its own, i.e., the node pointed to by p has at least one grandchild, control passes to step 117.

In the following steps the child nodes that have their own children are processed. To this end, set A is used to represent the set of nodes with children that need to be processed by recursively repeating the process starting with step 103. Initially, set A is empty. Set A is populated with listings of tuples, each of which is a finite sequence of objects. In this case each tuple has three objects that are related to the same node. The objects in a tuple for a node are a) a unique identifier of the node k(j), b) an identification of the parent of the node p, c) a table associated with the node, t(j). A tuple is added to set A for each node that has children. However, a table t(j) is only created the first time a node name is processed. For each table t(j) created, a column is added to table c and a pointer to table t(j) is placed in column c in the current row.

Step 117 points to the next previously not processed child node that itself has children represented by k(j) when the child nodes having children are represented in a series with values from 1 to J pointed to by variable j. Thus, k(j) represents a particular one of the child nodes that itself has children. Each node k(j) is assigned its own unique identifier, e.g., a pointer that uniquely identifies only the particular node k(j).

Thereafter, conditional branch point 119 tests to determine if there is a tuple in set A representing a node that 1) has the same name as that of the currently being processed node k(j) and 2) has as its parent the same parent p as that of the currently being processed node. This may be achieved by comparing the name of node k(j) with the name of each of the nodes pointed to by the identifiers of the tuples in set A until either a match is found or all the tuples in set A have been tested. If the test result in step 119 is NO, indicating that there is no tuple in set A corresponding to a node that has the same parent node p and the same name as the current node, a tuple for the current node needs to be added to set A and a table needs to be created for the currently being processed node. Therefore, control passes to step 121, in which a table t(j) is created for node k(j). The new table needs to have a unique identifier, but the scheme for assigning such names is at the discretion of the implementer. In one exemplary embodiment of the invention, a variable is incremented each time a new table name is needed, and the current variable value is used as the table name. Also in step 121 a tuple for node k(j) is formed, the tuple including a) the unique identifier of the node, b) p which is the parent of the node being processed, and c) a pointer to newly created table t(j).

Thereafter, control passes to step 123, in which, a column is added to table c, the column being named with the name of node k(j), and the pointer to newly created t(j) is put into the current row of table c in the just added column.

If the test result in step 119 is YES, indicating that there is at least one tuple in set A corresponding to a node that has the same name as the current node k(j) and the same parent p, control passes to step 125, in which a tuple for node k(j) is formed, the tuple including a) the unique identifier of the node; b) the parent of the node being processed, p; and c) the same pointer to a table t(j) that was pointed to by one of the tuples of set A that corresponded to a node that had the same name as the current node k(j) and the same parent p.

The implementer may convert the table name into a bookmark pointer, so that when the table name is displayed on a screen that a user may click on the table pointer and bring up the table onto the display screen.

After completion of step 123 or 125, as the case may be, control passes to conditional branch point 131, which tests to determine if set A is empty. If the test result in step 131 is NO, indicating that there are nodes with children that have not been processed yet, control passes to step 133. In step 133, the next tuple {q, k(m), t(m)} that is still in set A is selected to be processed next. Preferably, set A is an ordered set and tuples are selected from set A in a first in, first out manner. Thus, if set A is considered to be a list, tuples are added to the list at the bottom thereof, while tuples are selected to be processed from the top of the list.

Thereafter, table pointer variable c is set so that it points to the value of table pointer t(m) in step 135. Thus, variable c points to the table for node k(m). In step 137 node pointer p is set to point to node k(m). The tuple is then removed from set A in step 139, and thereafter, control passes back to step 103. As a result, the node of the tuple that was just removed from set A will be recursively processed as if it was the root node.

If the test result in step 131 is YES, indicating that all the nodes of the tree have been processed, and their associated tuples was removed from set A, control passes to step 151 in which the tables that have been produced and stored in memory are displayed. Such tables may be displayed on a display screen or printed. The process then exits in step 153.

Note that the foregoing is for general implementation. For implementation with XML, certain procedures may be required, and certain optimizations may be performed. For example, according to the XML language specification, the attribute term defined in the XML specification, i.e., the so-called "XML attribute" is used to associate a name-value pairs with the element term defined in the XML specification, i.e., the so-called "XML element", and, as such an XML attribute is not per-se defined in XML as a child node of an XML element. Thus, when implementing the process described hereinabove, each XML attribute should be treated as a leaf node that is a child of the associated element that contains it.

Furthermore, depending on the application, the implementer may choose to ignore XML namespace information. Note that should it not be ignored, namespace values should be used as further qualification for node names.

Furthermore, depending on the particular implementation, the implementer may choose to merge the values of two or more child leaf nodes and treat the nodes as a single leaf node that has the merged value as its value. Storing the merged value in a single table cell will eliminate the need to create a new table for each child. For example, in a tree that has many nodes with two children, where one child is named "type" with a value such as "SOFTWARE", and the other child is named "value" and has a value such as "V5.1", then the implementer may choose to combine the values of the two children of each node as "SOFTWARE/V5.1" and store the value in one cell, without creating a table for each value individually.

Additionally, depending on the particular implementation, the implementer may choose to treat a node at a level of the tree with a unique name and with only one child that does not have any children as a leaf node. Doing so, collapses the node and its child into one node. Advantageously, the number of tables created may be reduced, making the resulting set of tables even easier to understand.

Also, depending on the application, an XML element that has a text value but no children or attributes should be treated as a leaf node, with the text value being considered to be the value of the node.

Report 1 shows the result of performing the process of FIG. 1 on the XML tree description shown in Table 1.

Note that various programming languages may be used to implement the invention. One embodiment of the invention employs the well known Java™ language available from Sun Microsystems. Alternatively, it may be implemented in languages such as C++, Perl, and C#.

| Report 1 | | | |
|---|---|---|---|
| profile/ | | | |
| Description | Name | source | layers |
| original creation | NI4.0.23a | [source] | [layers] |
| profile/source | | | |
| Source | | | |
| 2004-10-13-04:00 | | | |
| 2004-10-14-06:00 | | | |
| 2004-10-15-12:00 | | | |
| profile/layers/ | | | |
| count | | layer | |
| 4 | | [layer] | |
| profile/layers/layer/ | | | |

-continued

Report 1

| name | switching |
|---|---|
| DS3 | Circuit |
| MPLS | Circuit |
| OC12 | Circuit |
| Ethernet | Packet |

What is claimed is:

1. A method for presenting text-based information encoded in a markup language format having a tree structure in a computer readable medium, wherein said tree structure has at least a root node, each node has a name, the method comprising the steps of:
   deriving relationships between said text-based information contained within said tree structure as a function of said tree structure;
   reformatting said text-based information contained within said tree structure into a set of labeled tables as a function of said derived relationships, said reformatting step further comprises:
   grouping, by name, sets of two or more nodes at a layer of said tree that have a common name;
   grouping those childless children nodes of a parent node at a level of said tree that are each named with a name that is common to at least two of said childless children nodes of said parent node at said level of said tree, said grouping being by their respective common name;
   for each node that has a value in at least one of said groupings, creating a row in said table that corresponds to said grouping and placing therein said value under said column labeled with said node name;
   creating one or more columns in a table for said parent node, one column being created for, and corresponding to, each said grouping;
   labeling each said created column in said table for said parent node with said common name of said childless children nodes of said corresponding grouping;
   creating for each grouping a corresponding table that is labeled with said common name of said childless children nodes of said corresponding grouping, each said created table being named with a unique identifier and having one row for each childless children node in its corresponding grouping;
   entering in each said created column a pointer to one of said created tables, each said pointer of a column pointing to a table having the same name as the name of said column; and
   displaying at least a portion of at least one table of said set in a manner perceivable by a human.

2. The invention as defined in claim 1 wherein, said reformatting step further comprises the steps of:
   creating a column in a table for the parent node of a childless node that has a unique name at a level of said tree;
   labeling said column with said unique name.

3. The invention as defined in claim 2 further comprising the step of entering a value of said childless node in a row of said table under said column named with said unique name when said childless node has a value.

4. The invention as defined in claim 3 further comprising the step of repeating said creating, labeling and entering steps for another childless node at said level of said tree that has a different unique name at said level of said tree.

5. The invention as defined in claim 1 wherein said reformatting step further comprises the step of grouping, by name, sets of one or more nodes at a layer of said tree that have children and a common name.

6. The invention as defined in claim 5 further comprising the steps of:
   creating an associated respective column for each said grouping in a table for a parent of said nodes at said layer;
   naming each column created in said creating step with said common name of said nodes of said grouping with which it is associated; and
   placing in each said named column said unique identifier of said table that corresponds to said column name.

7. The invention as defined in claim 5 further comprising the steps of:
   in each table created in said creating step, insert one row for each node that is a member of said grouping for which said table was created.

8. The invention as defined in claim 5 further comprising the steps of:
   recursively performing said deriving, reformatting and displaying steps for each of said children of said nodes at said layer that have children, when each of said children of said nodes at said layer that have children are treated as said root node of said tree structure.

9. The invention as defined in claim 5 wherein said common name is common to one node only.

10. The invention as defined in claim 5 wherein said common name is common to more than one node.

11. The invention as defined in claim 1 wherein said displaying is performed by a web browser.

12. The invention as defined in claim 1 wherein said tree structure is represented in an extensible markup language (XML) text format stored on a computer readable medium.

13. The invention as defined in claim 1 wherein, said reformatting step further comprises the step of merging at least two nodes of said tree and treating the resulting merged node as a single node.

* * * * *